R. MOOR.
Hub.

No. 15,770.

2 Sheets—Sheet 1.

Patented Sept. 23, 1856.

R. MOOR.
Hub.

No. 15,770.

2 Sheets—Sheet 2.

Patented Sept. 23, 1856.

UNITED STATES PATENT OFFICE.

ROBT. MOOR, OF WESTPORT, INDIANA.

SECURING SPOKES IN THE HUBS OF WHEELS.

Specification of Letters Patent No. 15,770, dated September 23, 1856.

*To all whom it may concern:*

Be it known that I, ROBERT MOOR, of Westport, Decatur county, Indiana, have invented new and useful Improvements in Carriage-Wheel Hubs; and I hereby declare the following to be a full and exact description thereof, reference being had to the accompanying drawings, making a part of this specification.

The object of my invention is to provide a form of spoke mortise which admits of a stronger wooden spoke of the same size than any now in use and one constructed with less labor.

Figure 1:
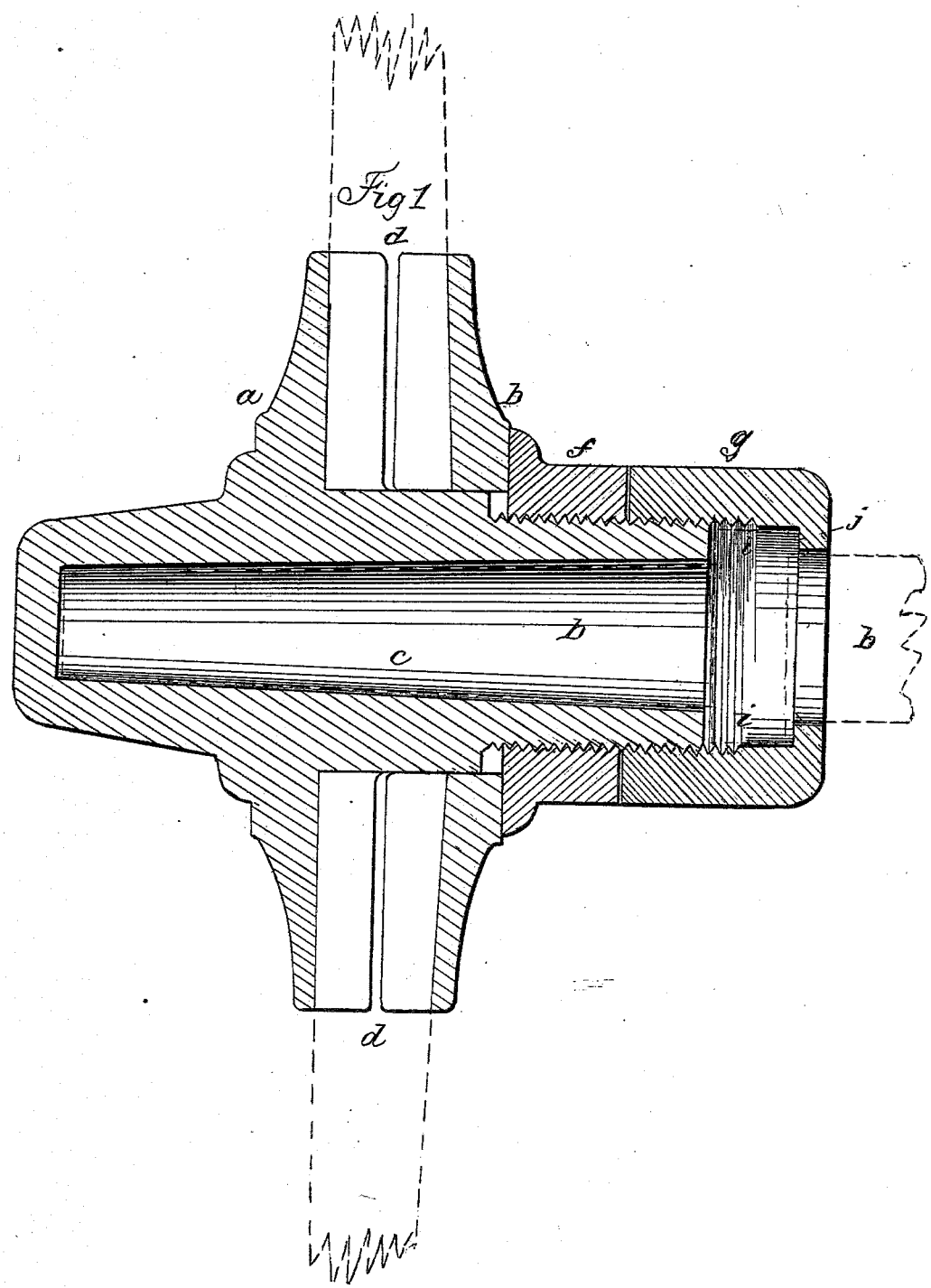
Figure 2:
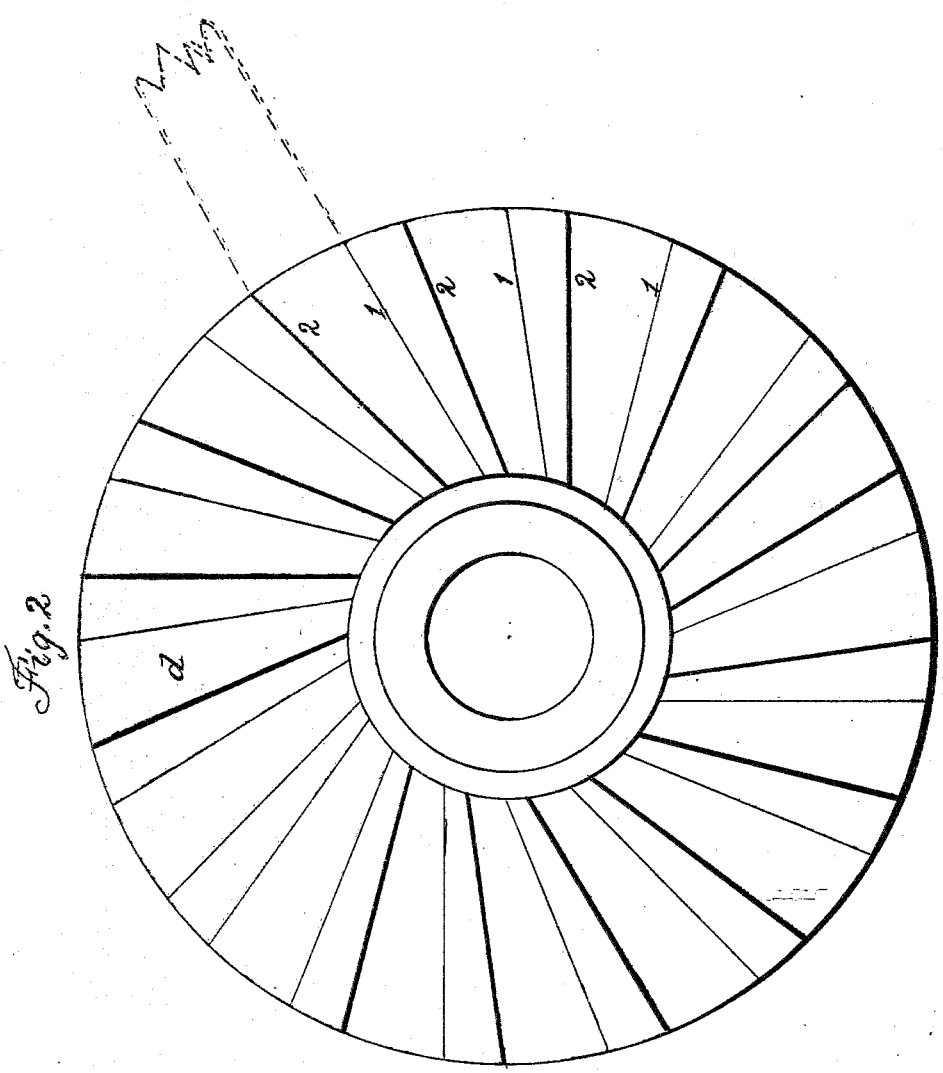

In the accompanying drawings Figure 1 is an axial section of the hub with all its parts attached together. Fig. 2 is an interior face view of one of the mortise plates of the same.

The outer plate (*a*) (with "bush" attached) contains the axle-socket (*c*) and one half of the spoke mortises (*d*) the other halves being contained in the inner plate or "clamp" (*h*). The ribs form the sides of the spoke mortises and likewise serve to stiffen the plate. The sides (1) of the spoke mortises flare inwardly from the periphery in a right line with the "following" side of the spokes, the "advance" sides (2) receiving all the necessary bevel. The end of the mortise-chamber in the fixed plate (answering to the outer edge of the spoke) is perpendicular to the periphery, while that in the clamp (answering to the inner edge) flares inwardly to correspond with the whole flare of the spoke. It will thus be seen that 3 out of the 4 sides of the spoke are enabled to be perfectly straight for their entire length which beside very materially reducing the labor of manufacture, adds to the utility of the spoke in the following respects. 1st The side bevel being exclusively on the "advance" side of the spoke presents the most favorable form to resist the thrust or crushing action to which that side is subjected when the wheel is rotating forward; while the "following" side, on which the tension is wholly felt is left straight with the grain entire or not cut across. 2nd, Both the edges of the spoke being straight for their entire length produce a dovetail which being wholly on the inner side is most favorable to prevent starting or drawing of the spoke in the operation of "tiring" or with use; and also gives the required "dish" to the wheel.

The spokes are firmly secured or any one or any number of them quickly removed (from the same side) by the operation of the nut (*f*) which may also be readily tightened when necessary to prevent the spokes becoming loose and rickety from shrinkage or use.

The axle (*b*) is secured in the socket (*c*) by means of the nut (*g*) confining the collar (*i*):—a chamber (*j*) being left around the collar for oil or grease.

I do not claim as my invention the device of two screw nuts working on one bush for the respective purposes of securing the spokes in the hub and the hub on the axle, neither do I claim the dovetailing of the spoke within the hub;—knowing these devices to be old. But

What I claim as new and as my invention herein is:—

The described oblique form of spoke mortise enabling all the necessary beveling and taper of the spoke to be on that side which is in advance when the wheel is rotating forward, leaving the "rear" side straight for its entire length, thus adding to the strength and reducing the labor of constructing the spoke as herein fully explained.

In testimony whereof I have hereunto set my hand before two subscribing witnesses.

ROBERT MOOR.

Attest:
GEO. H. KNIGHT,
JOHN S. HOLLINGSHEAD.